(12) United States Patent
Lenniger

(10) Patent No.: US 12,291,070 B2
(45) Date of Patent: May 6, 2025

(54) EMERGENCY OPERATING METHOD FOR AN ACTIVE CHASSIS OF A MOTOR VEHICLE

(71) Applicant: Dr. Ing. h.c. F. Porsche Aktiengesellschaft, Stuttgart (DE)

(72) Inventor: Christoph Lenniger, Renningen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 18/423,380

(22) Filed: Jan. 26, 2024

(65) Prior Publication Data

US 2024/0317010 A1    Sep. 26, 2024

(30) Foreign Application Priority Data

Mar. 24, 2023   (DE) ............... 10 2023 107 419.9

(51) Int. Cl.
*B60G 17/0185* (2006.01)
*B60G 17/06* (2006.01)

(52) U.S. Cl.
CPC ......... *B60G 17/0185* (2013.01); *B60G 17/06* (2013.01); *B60G 2202/416* (2013.01)

(58) Field of Classification Search
CPC ............... B60G 17/0185; B60G 17/06
See application file for complete search history.

(56) References Cited

U.S. PATENT DOCUMENTS

2007/0170680 A1   7/2007 Knaap
2024/0336105 A1 * 10/2024 Müller ............... B60R 16/02

FOREIGN PATENT DOCUMENTS

| DE | 3227265 | C2 | 1/1990 | |
| DE | 102006002983 | A1 | 8/2007 | |
| DE | 102008057610 | A1 * | 5/2010 | ...... F04B 49/06 |
| DE | 102023108631 | A1 * | 10/2024 | ...... B60G 17/0195 |

\* cited by examiner

*Primary Examiner* — Faye M Fleming
(74) *Attorney, Agent, or Firm* — Buchanan Ingersoll & Rooney PC

(57) ABSTRACT

An emergency operating method for operating an active chassis of a motor vehicle in the event of a failure of a pump of the active chassis. The method includes (a) detecting a termination of a proper electrical supply of an electric drive machine of the pump; (b) short-circuiting the electric drive machine operated at high voltage; and (c) disconnecting the high-voltage supply of the electric drive machine.

7 Claims, 2 Drawing Sheets

EMERGENCY OPERATING METHOD FOR AN ACTIVE CHASSIS OF A MOTOR VEHICLE

CROSS-REFERENCE TO RELATED APPLICATION

This application claims priority to German Patent Application No. 10 2023 107 419.9, filed Mar. 24, 2023, the content of such application being incorporated by reference herein in its entirety.

FIELD OF THE INVENTION

The invention relates to an emergency operating method for an active chassis of a motor vehicle, a chassis with such an emergency operating method for a motor vehicle, a motor vehicle with such a chassis, a computer program with such a motor vehicle, and a computer program product with such a computer program.

SUMMARY OF THE INVENTION

Known from the prior art are so-called active chassis, which are used in a motor vehicle for the wheel suspension, for example as a single-wheel suspension. For this purpose, a damper device (or several damper devices) comprised by this active chassis comprises a hydraulic or pneumatic cylinder and a hydraulic or pneumatic piston which is arranged therein and has a larger piston surface on the one side than on the other side, for example caused solely by the piston rod. These chassis are referred to as active because here not only the pressure above a hydraulic or pneumatic piston loaded on both sides but also the pressure gradient across the corresponding piston can be changed by means of a pump or a compressor. The piston is arranged in a cylinder and is pressure-loaded on both sides with a fluid. Such an active chassis is used, for example, in order to improve the driving stability of a particular motor vehicle and, optionally, the driving comfort for the vehicle occupants, for example when driving around curves, in that, in a dynamically controlled manner, an outer wheel of a motor vehicle in the curve is suspended with a larger damping hardness and an inner wheel in the curve is suspended with a lower damping hardness and/or the motor vehicle is tilted. Moreover, a particular wheel can be raised and/or a damping property can be changed in that a pressure gradient can be changeably set via at least one corresponding controllable throttle valve. For example, a pump with an electric drive machine is used in hydraulic damper devices.

Because states in which an electrical supply of the electric machine does not take place as designed can occur, a safety system must be created so that the active chassis continues to allow at least emergency operation of the motor vehicle.

Starting therefrom, it would be desirable to at least partially overcome the disadvantages known from the prior art. The features according to aspects of the invention emerge from the independent claims, for which advantageous embodiments are shown in the dependent claims. The features of the claims can be combined in any technically meaningful manner, wherein the explanations from the following description as well as features from the figures, which comprise supplementary embodiments of the invention, can also be used for this purpose.

The invention relates to an emergency operating method for an active chassis of a motor vehicle, wherein the active chassis comprises at least the following components:

a control device for controlling the chassis;
at least one damper device with a hydraulic cylinder and a hydraulic piston pressure-loaded on both sides by means of a hydraulic fluid;
a pump driven by an electric drive machine operated at high voltage, for generating a changeable pressure above the hydraulic piston;
a hydraulic pressure accumulator for providing an operating pressure for the at least one damper device; and,
for the at least one damper device, respectively at least one control valve for controlling a differential pressure across the hydraulic piston.

The emergency operating method is characterized primarily in that the control device performs the emergency operating method, which comprises at least the following steps in the order given:

a. detecting a termination of a proper electrical supply of the electric drive machine of the pump;
b. short-circuiting the electric drive machine operated at high voltage; and
c. disconnecting the high-voltage supply of the electric drive machine.

Ordinal numbers used in the description above and below are used only for clear differentiation and do not reflect any order or ranking of the designated components, unless explicitly indicated otherwise. An ordinal number greater than one does not necessitate that a further such component must necessarily be present.

For example, the active chassis proposed herein is of conventional design and can be controlled by means of a control device. The control device is a separate unit for a respective damper device for the entire chassis of a motor vehicle or is a central unit, for example integrated into an on-board computer. The damper device is designed as described above and comprises a hydraulic piston, pressure-loaded on both sides by means of a hydraulic fluid, in a hydraulic cylinder, wherein the lower side of the hydraulic piston during use is loaded with a higher force than the upper side of the hydraulic piston during use so that, when the same pressure acts on the hydraulic piston on both sides, a force for holding the motor vehicle at a desired level results. The different force at the same pressure on both sides is created by the difference between the two opposite surfaces of the hydraulic piston.

In order to now be able to actively bring about a change in this force, a pump is provided, which is driven by means of an electric drive machine operated at high voltage, so that a pressure in the hydraulic cylinder can be changed. A differential pressure can be generated across the hydraulic piston due to the arrangement of the pump or of the connecting lines, or preferably only in cooperation with the at least one control valve, preferably two control valves. In the case of a pure pressure change, the pressure ratio across the hydraulic piston, pressure-loaded on both sides, remains (at least technically) at one, i.e., the pressure on both sides remains the same. A consequence of the pressure change is thus a change in the force and the hardness of the damping. When generating a differential pressure, the ratio of the pressures on the two opposite sides of the hydraulic piston is changed and thus, for example without a change in the hardness and thus in the damping properties or at least less influence on the damping properties, a level change is achieved. Thus, it is, for example, possible to raise the motor vehicle as a whole, without significantly changing the damping properties, and/or to raise the motor vehicle when driving around curves via the outer wheel in the curve and to lower the inner wheel in the curve so that more comfortable and possibly more stable driving around curves is enabled.

Furthermore provided is a hydraulic pressure accumulator, with which an operating pressure is provided. Thus, an operating pressure (that is technically held constant) is provided, even if the pump is not currently operated. The pressure accumulator is in this case connected in such a way that it is not loaded during a pressure drop or pressure increases by means of the pump, for example by means of the at least one control valve and/or at least one corresponding check valve, which is preferably designed to be passive. A pressure change is thus not passed to the pressure accumulator, and a high efficiency of the pump is thus achieved.

The chassis, which represents at least possible embodiments of the active chassis performing the emergency operating method, is, for example, described in more detail below.

The emergency operating method proposed herein is configured for the case that the pump, or its electric drive machine operated at high voltage, can no longer be operated normally or fails completely. For this purpose, this state is detected first in step a. For example, voltage fluctuations and/or a voltage drop at the electric drive machine operated at high voltage are detected. In step b., the electric drive machine operated at high voltage is then short-circuited so that its rotor remains in an angular position and the pump, for example the pump wheel, is thus held in place. Immediately after the short-circuiting, the high-voltage supply of the electric drive machine is interrupted in step c. and the electric drive machine operated at high voltage as well as the pump remain in the state inhibited by the short circuit.

Possible causes for a termination of the proper electrical supply of the electric drive machine of the pump is, for example, that the pump has an internal fault and fails, for example electrical energy is no longer provided from the vehicle side, or, for example, an electrical supply is disrupted or interrupted due to a crash or other component defect.

In this inhibited state of the pump, unless there are serious other faults (for example, in the case of a crash), the chassis is now a passive chassis and thus continues to be roadworthy with restrictions (which are noticeable but, in terms of safety technology, at least permissible).

It should be noted that voltage changes are so critical for many electronic components that corresponding sensors are usually already integrated into the control device and/or the respective, electronically controlled components. Alternatively, or additionally, an additional measuring device is configured for this emergency operating method or a measuring device is formed by means of a corresponding connection of existing sensors.

It is furthermore proposed in an advantageous embodiment of the emergency operating method that at least the following steps are furthermore comprised in the order given:
  d. detecting a termination of an entire electrical supply of the electronic components of the damper device during or after step a.; and
  e. holding in place or setting the at least one control valve to a predetermined throttle position.

In one state, the electrical supply of the electrical components operated at low voltage is also disrupted, and no control by the control valves and/or also by means of the control device is thus enabled. For example, with the residual current of a capacitor or of a local emergency battery, the emergency operating method can furthermore be performed by means of the control device or by means of the electrical components operated at low voltage. Alternatively, a termination of an electrical supply is detected so early that the emergency operating method can already be completely performed before the end of the electrical supply.

Here, it is now proposed that, after detecting the termination of the entire electrical supply in step d., which is, for example, integrated in step a. or is performed in parallel thereto, in step e., in the at least one control valve is held in place in the current or a different predetermined throttle position, for example mechanically (with, for example, self-locking or a stop) or likewise by means of a short-circuit.

An operating state of the chassis which is advantageous in comparison to an overall failure of the system is thus set. The damping characteristic is thus influenced, namely in that a displacement of the hydraulic fluid from the one side in the hydraulic cylinder (the first chamber) to the other side (i.e., into the second chamber) in the hydraulic cylinder is possible only via such a control valve, which is in a defined throttle position. The speed of the exchange and of the filling of the two chambers is thus limited in a defined manner.

It is furthermore proposed in an advantageous embodiment of the emergency operating method that at least the following steps are furthermore comprised in the order given:
  f. detecting an existence of a low-voltage electrical supply of the electronic components of the damper device during or after step a.; and
  g. actively controlling the at least one control valve, which is preferably operated at low voltage in normal operation, for setting a semi-passive operation of the chassis.

In this operating state, by means of step f., which is integrated similarly to step d. in step a. or is performed in parallel thereto, a sufficient low-voltage supply is detected so that the corresponding electrical components operated at low voltage can still be actively controlled. The latter are preferably the control device and the at least one control valve. It should be pointed out again at this point that the pump, or its electric drive machine, is operated at high voltage and thus, in this state, has failed or has been fixed in place by means of the short circuit.

In step g., the at least one control valve is now controlled by means of the control device so that semi-passive operation of the chassis is enabled. That is to say, as a result of the influence of the forces from the outside, different damping properties can be set in that redistribution of the hydraulic fluid from the one chamber into the other chamber of the hydraulic cylinder can be influenced by means of a changeable throttle position of the at least one control valve. In the case of an extreme setting, even an exchange between the two chambers of the damper device is prevented or is enabled only via the pumping mechanism of the pump (which pumping mechanism forms a very high resistance due to the short circuit) by closing the at least one control valve. Alternatively, such a control valve cannot be completely closed, but only a maximum (and preferably also a minimum) throttling can be set.

It is furthermore proposed in an advantageous embodiment of the emergency operating method that at least one of the following steps is furthermore comprised:
  h. outputting a warning signal to at least one vehicle occupant of a motor vehicle with the emergency-operated chassis;
  i. outputting a command to reduce the mechanical load on the chassis, preferably a command to decelerate and/or to comply with a predetermined upper speed limit and/or a predetermined maximum steering angle; and j. outputting a command to engage a parking brake as soon as the motor vehicle with the emergency-operated chassis falls below a predetermined upper speed limit.

In this aspect of the emergency operating method, the driving safety is improved by communication or intervention of the control device indirectly or directly in the operating mode of the motor vehicle. In this respect, it is proposed that, in a step h., a warning signal is output to at least one vehicle occupant of the motor vehicle, for example an optical signal, an acoustic signal or a corresponding announcement or indication that the chassis is in emergency operation. Thus, the at least one vehicle occupant is free to continue or interrupt the trip according to their own safety need.

In a step i., a command is output, for example as an indication to a vehicle operator or as a direct input to a corresponding electronic vehicle assistance. In doing so, in step i., the mechanical load on the chassis is reduced by preventing corresponding driving states that mechanically load the chassis in the emergency-operated state and in an impermissibly heavy manner. For example, the vehicle is decelerated for this purpose, for example by means of a brake, an engine brake, a wheel brake, and/or by means of recuperation.

Alternatively, or additionally, a predetermined upper speed limit is set, wherein this limit is a fixed value or is dependent on the respective planned or present steering angle. A planned steering angle of, for example, be represented via a known trajectory of the motor vehicle with the aid of a geolocation (for example, GPS, Galileo or similar systems). Furthermore, one measure is to limit the maximum steering angle, wherein this maximum steering angle can preferably be set in a speed-dependent manner so that safe maneuvering of the vehicle is retained at least at walking speed.

In step j., after falling below a predetermined upper speed limit, which is, for example, below 10 km/h [ten kilometers per hour], preferably at 5 km/h or at 2 km/h, a parking brake is engaged so that a continuation of the trip of the motor vehicle with the emergency-operated chassis is then no longer possible. Step j. is thus the ultima ratio and only required if the emergency-operated chassis can no longer ensure safe driving operation or a predetermined duration of the operation of the chassis by means of the emergency operating method has elapsed.

According to a further aspect, a chassis for a motor vehicle is proposed, which chassis is an active chassis and comprises at least the following components:
  a control device for controlling the chassis;
  at least one damper device with a hydraulic cylinder and a hydraulic piston pressure-loaded on both sides by means of a hydraulic fluid;
  a pump driven by an electric drive machine operated at high voltage, for generating a changeable pressure above the hydraulic piston;
  a hydraulic pressure accumulator for providing an operating pressure for the damper device; and,
  for the at least one damper device, respectively at least one control valve, which is preferably operated at low voltage during normal operation, for controlling a differential pressure across the hydraulic piston, wherein the control device is configured to perform an emergency operating method according to an embodiment according to the above description.

For example, the active chassis proposed herein is designed as described above and, in this respect, reference is made to the description above. In a preferred embodiment, the chassis is a single-wheel system (an active wheel suspension) that is designed and controlled or adjusted independently of the other wheels. In another embodiment, the chassis is provided for a respective wheel axle, i.e., two wheels, wherein a single damper device is then preferably provided for each wheel. In a further embodiment, the chassis is designed with all required damper device for a motor vehicle, i.e., for example, four damper devices for the four wheels of a passenger vehicle.

The electric drive machine and the pump driven thereby are respectively provided only for a single damper device or for several damper devices together. The hydraulic pressure accumulator is likewise respectively configured only for a single damper device or for several damper devices together. The at least one control valve (preferably two control valves) for controlling a differential pressure across the hydraulic piston is respectively assigned to a damper device.

The control device proposed herein is configured to perform the emergency operating method described above and below, and is, for this purpose, integrated in a stand-alone control unit of the active chassis described herein, or in, for example, an on-board computer of a motor vehicle. The chassis also ensures in emergency operation that the motor vehicle can continue to be operated without any danger or that sufficient driving stability is ensured at least until the motor vehicle is shut down.

According to a further aspect, a motor vehicle is proposed, comprising at least the following components:
  at least one electric, particularly preferably a battery-electrically operated, traction machine, preferably operated at high voltage, and at least one drive wheel, which can be driven by means of the traction machine to propel the motor vehicle,
  wherein a respective drive wheel and/or a further wheel, suspended in pairs per axle or individually, of the motor vehicle is suspended by means of a chassis according to an embodiment according to the above description in a manner dampened by means of respectively at least one damper device.

The motor vehicle proposed herein comprises a traction machine, for example an internal combustion engine or an electric motor, or several traction machines, for example designed to be hybrid or purely electric, with respectively an electric motor and/or a wheel hub drive on a vehicle axle in at least one of the drive wheels of the motor vehicle. By means of the at least one traction machine, a propulsion of the motor vehicle can be generated via the drive wheels, generally two or four drive wheels. The driving behavior of the motor vehicle is stabilized via the active chassis in normal operation.

The chassis also ensures in emergency operation that the motor vehicle can continue to be operated without any danger or that sufficient driving stability is ensured at least until the motor vehicle is shut down.

According to a further aspect, a computer program is proposed, comprising computer program code, wherein the computer program code can be executed on at least one computer in such a way that the at least one computer is caused to perform the method according to an embodiment according to the above description, wherein at least one unit of the computer is arranged in an on-board computer of a motor vehicle, preferably according to an embodiment according to the above description.

The herein-described emergency operating method for an active chassis of a motor vehicle according to this embodiment is designed to be computer-implemented. The computer-implemented method is stored as computer program code, wherein the computer program code, when executed on a computer, for example comprising a data memory and a processor, causes the computer to perform the method according to an embodiment according to the above description.

For example, the computer-implemented method is realized by a computer program, wherein the computer program comprises the computer program code, wherein the computer program code, when executed on a computer, causes the computer to carry out the method according to an embodiment according to the above description. The term "computer program code" equivalently refers to one or more instructions or commands, which cause a computer to carry out a number of operations, which constitute an algorithm and/or other processing methods, for example.

Preferably, the computer program can be partially or entirely executed on an on-board computer and/or on a separate control device. The term "computer" is equivalently used herein to the devices known from the prior art. Accordingly, a computer comprises one or more general-purpose processors (CPU) or microprocessors, RISC processors, GPUs, and/or DSPs. For example, the computer comprises additional elements such as memory interfaces or communication interfaces. Optionally, or additionally, the terms refer to such a device that is capable of executing a provided or integrated program, preferably with standardized programming language (e.g., C++, JavaScript, or Python), and/or controlling and/or accessing data memory devices and/or other devices such as input interfaces and output interfaces. The term "computer" also refers to a multitude of processors or a multitude of (sub)computers that are interconnected via physical lines and/or otherwise communicatively connected and possibly jointly use one or more other resources, such as a data memory. A (data) memory is, for example, a hard drive (HDD) or a (non-volatile) solid-state memory, for example a ROM memory or flash memory [flash EEPROM]. The memory often comprises a plurality of separate physical units or is distributed to a multitude of separate devices so that access thereto takes place via data communication, for example package data service. The latter is a decentralized solution, wherein memories and processors of a multitude of separate computers are used instead of a (single) central server or in addition to a central server.

According to a further aspect, a computer program is proposed, on which computer program code is stored, wherein the computer program code can be executed on at least one computer in such a way that the at least one computer is caused to perform the method according to an embodiment according to the above description, wherein at least one unit of the computer is arranged in an on-board computer of a motor vehicle, preferably according to an embodiment according to the above description.

As a computer program product comprising the computer program code described above, is, for example, a medium, such as RAM, ROM, SD card, memory card, flash memory card or disk, or is stored on a server and downloadable. As soon as the computer program is rendered readable via a readout unit, for example a drive, and/or an installation, the computer program code contained therein and the method contained therein for segmenting objects moving on their own can be executed by a computer or in communication with a plurality of server units, for example according to the above description.

BRIEF DESCRIPTION OF THE DRAWINGS

The invention described above is explained in detail below with reference to the accompanying drawings, which show preferred embodiments, in light of the relevant technical background. The invention is not limited in any way by the purely schematic drawings, whereby it should be noted that the drawings are not true to scale and are not suitable for defining dimensional relationships. Shown are.

DETAILED DESCRIPTION OF THE INVENTION

Figure 1:
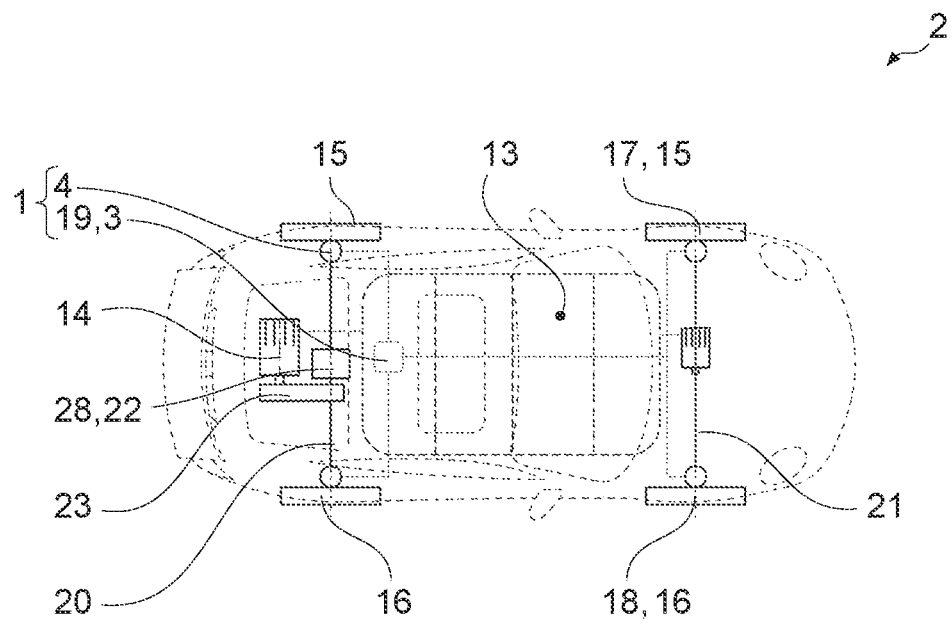
FIG. 1: a motor vehicle with an active chassis.

FIG. 1 shows a motor vehicle 2 with an active chassis 1 in a schematic plan view. The active chassis 1 shown here is, for example, of conventional design and can be controlled by means of a control device 3. The control device 3 is here designed as a unit integrated into the on-board computer 19, for all damper devices 4 of the entire chassis 1 of the motor vehicle 2 together and is connected to the four damper devices 4 (only one denoted here pars pro toto) shown here. The motor vehicle 2 shown here also comprises a traction machine 14 in the left (rear) region of the motor vehicle 2 in the illustration and, purely optionally, a second traction machine 14 in the right (front) region of the motor vehicle 2. The traction machines 14 in this exemplary embodiment are designed as electric drive machines 8, wherein the rear traction machine 14 is connected in a torque-transmitting manner to the rear axle 20 by means of a differential 22 and a transmission 23. The motor vehicle 2 shown is (purely optionally) designed as a battery-electric vehicle [BEV] and the traction machines 14 can be supplied with electrical energy by means of an energy storage element 13 (here a high-voltage battery). The rear axle 20 transmits the torque of the traction machine 14 to a left drive wheel 15 and a right drive wheel 16, wherein the two drive wheels 15, 16 are suspended by means of the active chassis 1 in a dampened manner and are configured to comply with an upper speed limit by means of a respective parking brake 28. In addition, a left wheel 17 and a right wheel 18 are arranged on the front axle 21, wherein said wheels are also suspended in a manner dampened by means of the active chassis 1.

Figure 2:
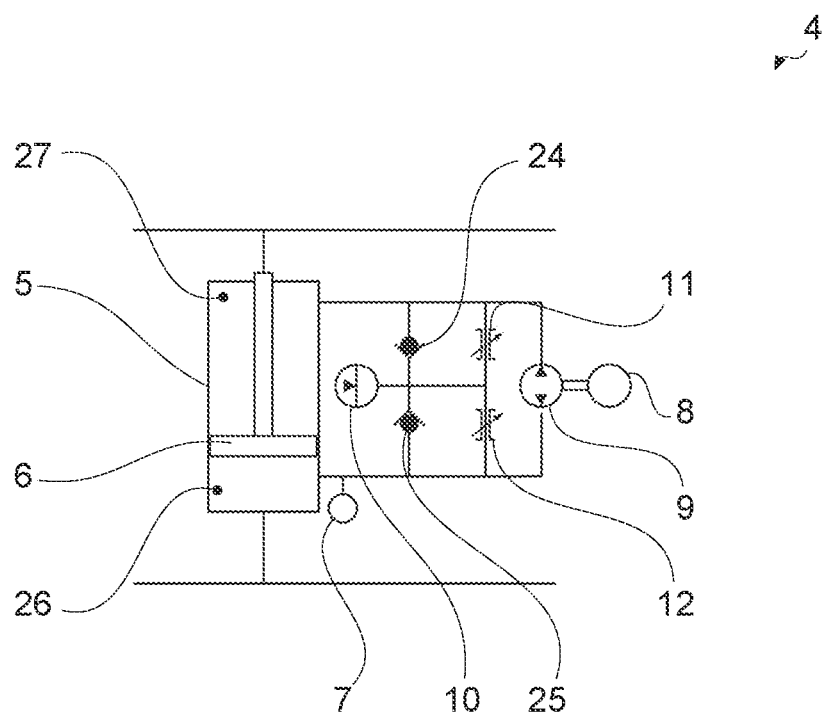
FIG. 2: a damper device of an active chassis.

FIG. 2 shows a damper device 4 of an active chassis 1 of a motor vehicle 2 in a circuit diagram. The damper device 4 of the chassis 1 comprises a hydraulic piston 6, pressure-loaded on both sides, in a hydraulic cylinder 5, wherein, due to the surface area ratios, the lower (i.e., wheel) side of the hydraulic piston 6 during use and in the illustration is loaded with a higher force than the upper (i.e., chassis) side of the hydraulic piston 6 during use so that a force for holding the motor vehicle 2 at a desired level is ensured when the same pressure acts on the hydraulic piston 6 on both sides. In order to now be able to actively bring about a change in this force, a pump 9 is provided, which is driven by means of an electric drive machine 8 operated at high voltage, so that a pressure in the hydraulic cylinder 5 can be changed. In the embodiment shown, a differential pressure may be generated across the hydraulic piston 6 only in cooperation with the at least one control valve 11, preferably two control valves 11, 12.

The left side of the illustration shows the hydraulic cylinder 5, in which a hydraulic piston 6 with a connected piston rod (as shown above) is movably guided up and down in a manner pressure-loaded on both sides. Thus, a lower chamber 26 is formed below the hydraulic piston 6, and an upper chamber 27 is formed above the hydraulic piston 6, wherein the piston rod is arranged in the upper chamber 27 and at least this piston rod reduces the effective upper piston surface in comparison to the effective lower piston surface. The chambers 26, 27 are both hydraulically connected to the pressure accumulator 10 and the pump 9 (driven by an electric drive machine 8). The pressure accumulator 10 is protected by means of the check valves 24, 25 from being loaded with pressure by the pump 9. Preferably, a sensor 7, for example for measuring both the pressure and the temperature, is provided in at least one of the connecting lines (alternatively, or additionally, in at least one of the chambers 26, 27). By means of the two control valves 11, 12 or their set throttle position, an exchange speed between the two chambers 26, 27 and the pressure accumulator 10 can be controlled.

If the pump 9 (or its electric drive machine 8) is short-circuited, a flow via the connecting line in which the pump 9 (or its pumping mechanism) is arranged can no longer be flowed or has a significantly higher flow resistance than the control valves 11, 12 in normal operation. The control valves 11, 12 are thus arranged in the only connecting line that can still be flowed between the two chambers 26, 27. Thus, in emergency operation, a hardness of the damper device 4 is fixedly set or semi-passively controlled via the control valves 11, 12 (operated at low voltage).

Figure 3:
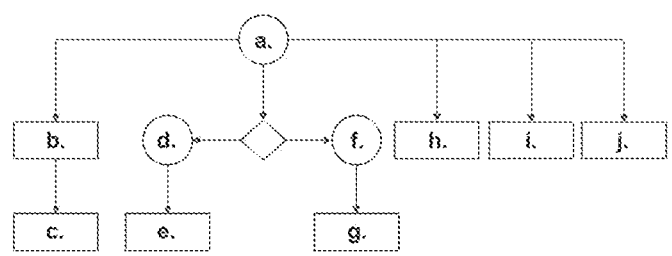
FIG. 3: a flow chart of an emergency operating method for an active chassis.

FIG. 3 shows a flow chart of an emergency operating method for an active chassis 1. In the description below, reference is made purely for reasons of clarity, without limiting generality, to the damper device 4 according to FIG. 2 and the active chassis 1 according to FIG. 1 and, in this respect, reference is made to the description there. The emergency operating method proposed herein is configured for the case that the pump 9, or its electric drive machine 8 operated at high voltage, can no longer be operated normally or fails completely. For this purpose, this state is detected first in step a. For example, voltage fluctuations and/or a voltage drop at the electric drive machine 8 operated at high voltage are detected. In step b., the electric drive machine 8 operated at high voltage is then short-circuited so that its rotor remains in an angular position and the pump 9, for example the pump wheel, is thus held in place. Immediately after the short-circuiting, the high-voltage supply of the electric drive machine 8 is interrupted in step c. and the electric drive machine 8 operated at high voltage as well as the pump 9 remain in the state inhibited by the short circuit.

In addition to the no longer normal operation of the components operated at high voltage, failure of the components operated at low voltage may also occur so that a termination of the entire electrical supply takes place, which is detected in step d., which is performed here in parallel to step a. In the subsequent step e., the at least one control valve 11, 12 is held in place in the current or a different predetermined throttle position, for example likewise as a result of a short circuit. An operating state of the chassis 1 which is advantageous in comparison to an overall failure of the system is thus set.

If a sufficient low-voltage supply is detected in a step f. so that the corresponding electrical components operated at low voltage, which are preferably the control device 3 and the control valves 11, 12, can still be actively controlled, step g. follows. In step g., the at least one control valve 11, 12 is now controlled by means of the control device 3 so that a semi-passive operation of the chassis 1 is enabled. That is to say, as a result of the influence of the forces from the outside, different damping properties can be set in that redistribution of the hydraulic fluid from the one chamber into the other chamber can be influenced by means of a changeable throttle position of the at least one control valve 11, 12.

As an optional additional service or inclusion in a vehicle assistance, it is proposed here (purely optionally) that the subsequent events are triggered when a no longer normal operation has been detected in step a. For example, in a step h., a warning signal is output to at least one vehicle occupant of the motor vehicle 2, for example an optical signal, an acoustic signal or a corresponding announcement or indication that the chassis 1 is in emergency operation. In a step i., a command is output, for example as an indication to a vehicle operator or as a direct input to a corresponding electronic vehicle assistance. In doing so, in step i., the mechanical load on the chassis 1 is reduced by preventing corresponding driving states that mechanically load the chassis 1 in the emergency-operated state and in an impermissibly heavy manner. For example, the vehicle is decelerated for this purpose. In the final step j., after falling below a predetermined upper speed limit, a parking brake 28 is engaged so that a continuation of the trip of the motor vehicle 2 with the emergency-operated chassis 1 is then no longer possible. Step j. is thus the ultima ratio and only required if the emergency-operated chassis 1 can no longer ensure safe driving operation or a predetermined duration of the operation of the chassis 1 by means of the emergency operating method has elapsed.

With the emergency operating method proposed herein, an emergency operation property is ensured with available means in the event of a failure of the pump.

What is claimed is:

1. An emergency operating method for an active chassis of a motor vehicle, wherein the active chassis comprises at least the following components:
    (i) a control device for controlling the active chassis;
    (ii) at least one damper device with a hydraulic cylinder and a hydraulic piston pressure-loaded on both sides by a hydraulic fluid;
    (iii) a pump driven by an electric drive machine, which is operated at a voltage, for generating a changeable pressure above the hydraulic piston;
    (iv) a hydraulic pressure accumulator for providing an operating pressure for the at least one damper device; and
    (v) for the at least one damper device, respectively at least one control valve for controlling a differential pressure across the hydraulic piston,
    wherein the emergency operating method is performed by the control device and comprises at least the following steps in the order given:
    a. detect a termination of an electrical supply of the electric drive machine of the pump;
    b. short-circuit the electric drive machine; and
    c. disconnect the voltage supply of the electric drive machine.

2. The emergency operating method according to claim 1, wherein the method further comprises the following steps in the order given:

detect a termination of an entire electrical supply of electronic components of the damper device during or after step a.; and hold in place or set the at least one control valve to a predetermined throttle position.

3. The emergency operating method according to claim 1, wherein the method further comprises the following steps in the order given:

detect an existence of a lower voltage electrical supply of the electronic components of the damper device during or after step a.; and actively control the at least one control valve, which is operated at a lower voltage in normal operation, for setting a semi-passive operation of the chassis.

4. The emergency operating method according to claim 1, further comprising the following steps:

output a warning signal to at least one vehicle occupant of a motor vehicle with the chassis;

output a command to reduce a mechanical load on the chassis, wherein the command comprises a command to decelerate and/or to comply with a predetermined upper speed limit and/or a predetermined maximum steering angle; and output a command to engage a parking brake as soon as the motor vehicle falls below a predetermined upper speed limit.

5. An active chassis for a motor vehicle, said active chassis comprising:

a control device for controlling the active chassis;

at least one damper device with a hydraulic cylinder and a hydraulic piston pressure-loaded on both sides by a hydraulic fluid;

a pump driven by an electric drive machine, which is operated at a voltage, for generating a changeable pressure above the hydraulic piston;

a hydraulic pressure accumulator for providing an operating pressure for the damper device; and for the at least one damper device, respectively at least one control valve, which is operated at lower voltage during normal operation, for controlling a differential pressure across the hydraulic piston, wherein the control device is configured to:

a. detect a termination of an electrical supply of the electric drive machine of the pump;

b. short-circuit the electric drive machine; and c. disconnect the voltage supply of the electric drive machine.

6. A motor vehicle, comprising:

the active chassis of claim 5, at least one electric traction machine, at least one drive wheel, which can be driven by the electric traction machine to propel the motor vehicle, a respective drive wheel and/or a further wheel, suspended in pairs per axle or individually, from the chassis by the at least one damper device.

7. A computer program comprising computer program code, wherein the computer program code can be executed on at least one computer in such a way that the at least one computer is caused to perform the steps a. through c. of claim 5, wherein at least one unit of the computer is arranged in an on-board computer of the motor vehicle.

* * * * *